US010210624B2

United States Patent
Shmueli et al.

(10) Patent No.: US 10,210,624 B2
(45) Date of Patent: Feb. 19, 2019

(54) METHOD FOR DETERMINING DEPTH FOR STEREOSCOPIC RECONSTRUCTION OF THREE DIMENSIONAL IMAGES

(71) Applicant: INUITIVE LTD., Ra'anana (IL)

(72) Inventors: Niv Shmueli, Tel Aviv (IL); Samuel Lifsches, Tel Aviv (IL)

(73) Assignee: INUITIVE LTD., Ra'anana (IL)

( * ) Notice: Subject to any disclaimer, the term of this patent is extended or adjusted under 35 U.S.C. 154(b) by 55 days.

(21) Appl. No.: 15/534,231

(22) PCT Filed: Dec. 6, 2015

(86) PCT No.: PCT/IL2015/000049
§ 371 (c)(1),
(2) Date: Jun. 8, 2017

(87) PCT Pub. No.: WO2016/092532
PCT Pub. Date: Jun. 16, 2016

(65) Prior Publication Data
US 2017/0365066 A1    Dec. 21, 2017

Related U.S. Application Data

(60) Provisional application No. 62/089,271, filed on Dec. 9, 2014.

(51) Int. Cl.
*G06K 9/00* (2006.01)
*G06T 7/593* (2017.01)
(Continued)

(52) U.S. Cl.
CPC ............. *G06T 7/593* (2017.01); *G06F 17/10* (2013.01); *G06T 1/60* (2013.01); *G06T 7/97* (2017.01); *G06T 2207/10012* (2013.01)

(58) Field of Classification Search
None
See application file for complete search history.

(56) References Cited

U.S. PATENT DOCUMENTS 6,125,198 A    9/2000 Onda
7,194,126 B2   3/2007 Konolige
(Continued)

FOREIGN PATENT DOCUMENTS

EP    2860695 A1    4/2015

*Primary Examiner* — Sean M Conner
(74) *Attorney, Agent, or Firm* — Browdy and Neimark, PLLC

(57) ABSTRACT

A method is provided for obtaining a disparity map for reconstructing a three dimensional image. The map is based upon a large range of disparities and is obtained by using a hardware provided with a buffer capable of storing data that relates to substantially less disparities than a data associated with the large disparities' range. The method comprises the steps of: providing a pair of stereoscopic images captured by two image capturing devices; dividing the large disparities' range into N disparity ranges; executing a stereo matching algorithm for a plurality of times, using data retrieved from a pair of captured images, wherein the algorithm is executed each time while using a different disparity range out of the N disparity ranges, thereby obtaining a plurality of individual disparity maps, each corresponding to a different disparity range; and merging the individual disparity maps to generate a map of the large disparities' range.

5 Claims, 2 Drawing Sheets

(51) Int. Cl.
*G06T 1/60* (2006.01)
*G06T 7/00* (2017.01)
*G06F 17/10* (2006.01)

(56) References Cited

U.S. PATENT DOCUMENTS

| | | |
|---|---|---|
| 2006/0013473 A1 | 1/2006 | Woodfill et al. |
| 2006/0056727 A1 | 3/2006 | Jones et al. |
| 2009/0067705 A1 | 3/2009 | Yu et al. |
| 2010/0158129 A1 | 6/2010 | Lai et al. |
| 2013/0071009 A1 | 3/2013 | Ha |
| 2013/0129194 A1 | 5/2013 | Gusis et al. |
| 2013/0136339 A1 | 5/2013 | Moon et al. |
| 2014/0198977 A1 | 7/2014 | Narasimha et al. |
| 2014/0241612 A1 | 8/2014 | Rhemann et al. |
| 2015/0054913 A1 | 2/2015 | Annau et al. |
| 2015/0206313 A1* | 7/2015 | Reif .................. G06T 7/0075 382/103 |
| 2015/0248769 A1 | 9/2015 | Ukil et al. |

* cited by examiner

METHOD FOR DETERMINING DEPTH FOR STEREOSCOPIC RECONSTRUCTION OF THREE DIMENSIONAL IMAGES

TECHNICAL FIELD

The present disclosure generally relates to methods for using optical devices, and more particularly, to methods that enable stereoscopic reconstruction of three dimensional images.

BACKGROUND

A stereoscopic camera arrangement is an element made of two camera units, assembled in a stereoscopic module. Stereoscopy (also referred to as "stereoscopics" or "3D imaging") is a technique for creating or enhancing the illusion of depth in an image. In other words, it is the impression of depth that is perceived when a scene is viewed with both eyes by someone with normal binocular vision which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, each derived from a different image capturing device.

Stereo matching algorithms are used to solve the compatibility in stereo images by using feature-, phase-, or area-based matching to calculate disparities in the images. Feature-based matching searches are used for searching characteristics in the images, like edges or curves, which in turn are used for calculating the best matches according to the similarities found. Phase-based algorithms band pass filter the images and extract their phase. Area-based algorithms operate on blocks of pixels from both images and calculate their level of matching. This can be done in parallel for all analyzed pixels. When using a constant block size over the whole image, called box filtering, these algorithms are especially amenable to parallel and hardware-based solutions.

Color information may be used to improve the matching performance significantly. However, the required hardware resources for processing color images on embedded real-time systems are still very high.

The depth to be detected, dictates a disparity range to be checked, and the depth calculation under real time conditions typically consumes quite a substantial amount of the CPU available at the processing device.

Hardware based solutions implementing stereoscopic matching algorithms are rather complicated and require substantial silicon footprint. The silicon size depends monotonically and almost linearly on the number of disparities that the hardware utilizes for carrying out these stereoscopic matching algorithms matching. Consequently, hardware based solutions for stereoscopic matching are designed to handle only a limited range of disparities which may cover only typical cases which system may face.

However, there are practical implementations, in particularly when depth has a large value, that require that the disparity range used when carrying out the stereoscopic matching algorithm, is substantially higher than the disparity range available in hardware based solutions. This problem is not solved by the prior art hardware based solutions, and therefore, there is a need to solve the problem of how to enable the use of higher disparity ranges while using hardware based stereoscopic matching algorithms, where the hardware is restricted to the use of a substantially lower ranges of disparities.

SUMMARY OF THE DISCLOSURE

The disclosure may be summarized by referring to the appended claims.

It is an object of the present disclosure to provide a method for obtaining improved and fast analyzing of large amount of image data received from one or more sensors.

It is another object of the present disclosure to provide a method for analyzing video frames by learning the scene captured therein and dynamically changing the disparity range used at a specific part thereof.

It is still another object of the present disclosure to provide a method for analyzing a sequence of images acquired, where the first few images are used to map and learn the scene whereas for the following images there is a dynamic decision process for updating the images and allowing to focus mainly on dynamic parts of the images.

Other objects of the present invention will become apparent from the following description.

According to one embodiment of the disclosure, there is provided a method for obtaining a disparity map for reconstructing a three dimensional image under real time (or near real time) conditions, wherein the disparity map is based upon a large range of disparities (R_D) and is obtained by using a hardware provided with a storage means (e.g. a FIFO mechanism for organizing and manipulating a data buffer, a data stack and the like), which is configured to store data associated with HW_D disparities having substantially less than a capacity required for storing data associated with the large disparities' range. The method comprises the steps of:

providing a pair of stereoscopic images captured essentially simultaneously by two image capturing devices;

dividing the large disparities' range into N disparity ranges, wherein each of the N disparity ranges is associated with an amount of data that is less than or equal to HW_D, wherein a minimal disparity range for each of the disparity ranges is equal to HW_D_min(i), and wherein N is an integer greater than 1;

executing a stereoscopic matching algorithm for a plurality of times, using the same data retrieved from the pair of corresponding captured images, wherein the stereo matching algorithm is executed each time while using a different disparity range selected from among the N disparity ranges, thereby obtaining a plurality of individual disparity maps, each of which corresponds to a different disparity range; and merging the plurality of individual disparity maps and generating therefrom a map of the large disparities' range for reconstructing the three dimensional image.

In accordance with another embodiment, each of the individual disparity range maps is a result of a calculation carried out for a disparity range of: [HW_D_min(i), HW_D_min(i)+HW_D−1], where HW_D_min(i) is a minimal disparity used for the disparity range i out of the N disparity ranges, and wherein i is an integer having a value between 1 and N.

According to another embodiment, the hardware used for executing the stereo matching algorithm, is at least one FPGA and/or at least one ASIC.

By yet another embodiment, the storage means has a capacity that is derived from an image input rate associated with each of the two image capturing devices and from a processing rate associated with that hardware.

In accordance with still another embodiment, in case the image input rate is higher than a pre-determined rate and/or the processing rate of the hardware is slower than a pre-determined rate, only part of the N disparity ranges are used to obtain respective disparity range maps therefrom, and wherein these respective disparity range maps thus obtained are used for generating the large disparities' range map for reconstructing the three dimensional image.

The term "stereoscopic" (or "stereo") as used herein throughout the specification and claims, is used typically to denote a combination derived from two or more images, each taken by a different image capturing means, which are combined to give the perception of three dimensional depth. However, it should be understood that the scope of the present invention is not restricted to deriving a stereoscopic image from two sources, but also encompasses generating an image derived from three or more image capturing means.

The term "image" or "image capturing device" as used herein throughout the specification and claims, are used to denote a visual perception being depicted or recorded by an artifact (a device), including but not limited to, a two dimensional picture, a video stream, a frame belonging to a video stream, and the like.

BRIEF DESCRIPTION OF THE DRAWING

For a more complete understanding of the present invention, reference is now made to the following detailed description taken in conjunction with the accompanying drawing wherein.

DETAILED DESCRIPTION

Figure 1:
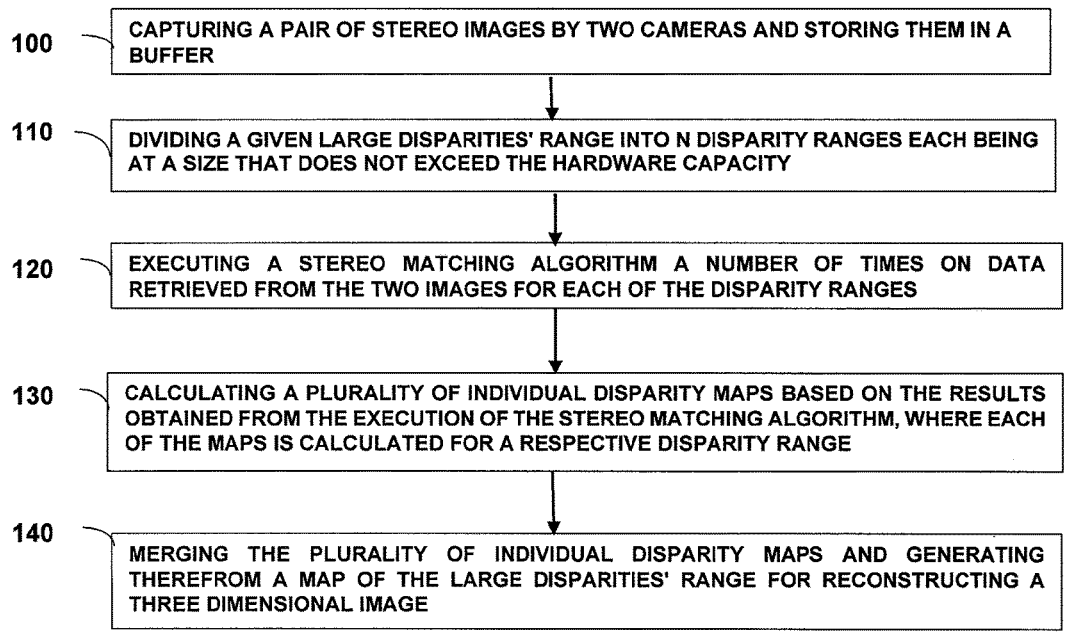
FIG. 1—is a flow chart illustrating a method for carrying out an embodiment of the present invention.

In this disclosure, the term "comprising" is intended to have an open-ended meaning so that when a first element is referred to as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

The solution provided by the present disclosure relies on a multiple use of the available hardware (which, in turn, is capable of providing only a limited disparity range (HW_D)), for covering a larger disparity range to enable generating more detailed three dimensional images. Generally, this solution enables introducing few times data retrieved from the very same stereo images' pairs into the hardware, where each time a different disparity range is applied, thereby resulting in a number of corresponding disparity maps for each of the respective disparity range being used. The various disparity maps derived from the given pair of images by using the different disparity ranges are then merged so that the result of this merging is a final map that covers the required large disparities' range.

Let us consider now the following example. In this example, the images are captured by the image capturing devices and stored in a buffer (step 100). Assuming that the hardware available is adapted to cover a range of HW_D disparities, therefore, for each run (execution) by the hardware, a disparity map is retrieved for a corresponding disparity range: [HW_D_min(i), HW_D_min(i)+HW_D−1] where HW_D_min(i) is the minimal disparity that is used in run No. i.

Now, when a large disparity range is required (i.e. when the required range of disparities is substantially larger than HW_D disparity range), that large disparity range is divided into N disparity ranges (step 110), each of a size that does not exceed the size of HW_D. The minimal disparity for each range is: HW_D_min(i). The stereo matching algorithm is executed by the hardware (e.g. by an FPGA or an ASIC) for a number of times (step 120), while each time data derived from the same pair of stereo images is used, but with a different disparity range. The outcome of this process is that a respective individual disparity map is calculated for each one of the N disparity ranges (step 130). These N individual disparity maps are then merged into one full disparity range map covering the required large disparities' range (step 140).

In order to implement the above described method under real time (or near real time) conditions while obtaining a full disparity range map (from which a corresponding 3D image may be reconstructed), each pair of stereo images is stored in a memory (e.g. a double data rate, "DDR", memory). From that memory, each pair of stereo images is retrieved and introduced (e.g. injected) to the hardware as describe above. Depending on the image input rate and on the hardware processing rate, one is able to obtain a full disparities' range map for each pair of images, preferably when the image input rate is low and/or when the hardware comprises a strong (fast) processor. It would still be possible to obtain the required end result even if not all the input frames are processed, e.g. due to high input frame rate and/or while using a slow processing device.

Figure 2:
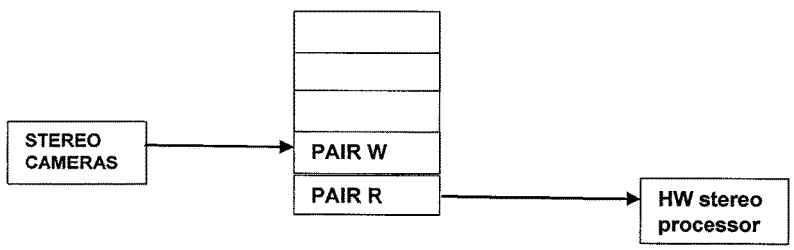
FIG. 2 to FIG. 4 demonstrate steps of an example embodiment of the present invention.
Figure 3:
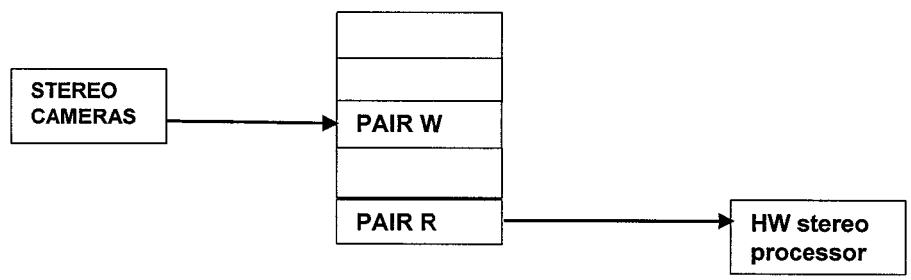
Figure 4:
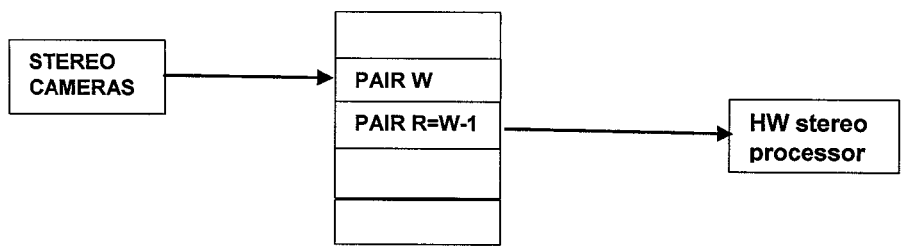

FIGS. 2 to 4 demonstrate steps of a method carried out according to an embodiment of the present invention, where a FIFO mechanism in a DDR memory is used.

First, (FIG. 2) a new pair of images is written at the location W of the FIFO, while the hardware (e.g. an ASIC) executes the stereo matching algorithm on a pair of images located at location R of the FIFO.

In FIG. 3, the hardware completes the processing of a frame which comprises information derived from the pair of corresponding images received at the same time, and as demonstrated in FIG. 4, once the hardware completes processing the current pair of images, it begins processing the next frame that will be at the location W−1.

In this example, the hardware is configured to process one frame out of two frames that are each introduced to the FIFO from both stereo cameras. Therefore one may obtain a full range disparity map for every second stereo images received from the image capturing devices (the cameras).

As will be appreciated by those skilled in the art, the FIFO size is preferably dictated by the cameras' input frame rate and by the hardware processor operating rate.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the apparatus may include a cameras' array that has two or more cameras, such as, for example, video cameras to capture two or more video streams of the target. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for obtaining a disparity map for reconstructing a three dimensional image under real time conditions, wherein said disparity map is based upon a large range of disparities and is obtained by using a hardware provided with a buffer configured to store data associated with HW_D disparities, the buffer having capacity which is substantially less than a capacity required for storing data associated with the large range of disparities, said method comprising the steps of:

providing a pair of stereoscopic images captured essentially simultaneously by two image capturing devices;

dividing said large range of disparities into N disparity ranges, wherein each of said N disparity ranges is associated with an amount of data that is less than or equal to HW_D, wherein a minimal disparity range for each of the disparity ranges is equal to HW_D_min(i), wherein N is an integer greater than 1, and wherein i represents a disparity range out of the N disparity ranges and is an integer having a value between 1 and N;

executing a stereo matching algorithm a plurality of times, using data retrieved from the pair of corresponding captured images, wherein the stereo matching algorithm is executed each time while using a different disparity range selected from among the N disparity ranges, thereby obtaining a plurality of individual disparity maps, each of which corresponds to a different disparity range; and merging the plurality of individual disparity maps to generate therefrom a map of the large range of disparities for reconstructing the three dimensional image.

2. The method of claim 1, wherein each of the individual disparity range maps is a result of a calculation carried out for a disparity range of: [HW_D_min(i), HW_D_min(i)+ HW_D−1].

3. The method of claim 1, wherein said hardware used for executing the stereo matching algorithm is a field-programmable gate array (FPGA) or an application-specific integrated circuit (ASIC).

4. The method of claim 1, wherein the storage means has a size that is derived from an image input rate associated with each of the two image capturing devices and from a processing rate associated with said hardware.

5. The method of claim 4, wherein in case the image input rate is higher than a first pre-determined rate and/or the processing rate of said hardware is slower than a second pre-determined rate, only part of the N disparity ranges are used to obtain respective disparity range maps therefrom, and wherein said respective disparity range maps thus obtained are used for generating the map of the large disparities' range of disparities for reconstructing the three dimensional image.

* * * * *